United States Patent
Kanda et al.

(10) Patent No.: US 10,837,548 B2
(45) Date of Patent: Nov. 17, 2020

(54) MOTOR CONTROL METHOD TO IMPROVE COLD RESPONSE TIME IN A MOTOR PUMP HYDRAULIC SYSTEM

(71) Applicant: Eaton Intelligent Power Limited, Dublin (IE)

(72) Inventors: Robert J. Kanda, Lake Orion, MI (US); Matthew R. Busdiecker, Beverly Hills, MI (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 16/605,058

(22) PCT Filed: Apr. 16, 2018

(86) PCT No.: PCT/IB2018/052637
§ 371 (c)(1),
(2) Date: Oct. 14, 2019

(87) PCT Pub. No.: WO2018/189732
PCT Pub. Date: Oct. 18, 2018

(65) Prior Publication Data
US 2020/0278024 A1    Sep. 3, 2020

Related U.S. Application Data

(60) Provisional application No. 62/485,847, filed on Apr. 14, 2017.

(51) Int. Cl.
*F16H 61/00*    (2006.01)
*F16H 59/72*    (2006.01)
(Continued)

(52) U.S. Cl.
CPC .... *F16H 61/0031* (2013.01); *B60K 2023/043* (2013.01); *F16H 59/72* (2013.01); *F16H 2048/204* (2013.01)

(58) Field of Classification Search
CPC ....... F16H 61/0021–0031; F16H 59/72; F16H 48/20; F16H 48/32; F16H 2048/204; F16H 2048/343; B60K 2023/043; B60K 23/04
See application file for complete search history.

(56) References Cited

U.S. PATENT DOCUMENTS

| 7,007,782 B2 | 3/2006 | Anwar et al. |
| 2004/0159520 A1 | 8/2004 | Anwar et al. |

(Continued)

FOREIGN PATENT DOCUMENTS

| DE | 10128856 B4 | 6/2015 |
| EP | 2570344 A2 | 3/2013 |

(Continued)

OTHER PUBLICATIONS

International Search Report and Written Opinion for PCT/162018/052637, dated Sep. 20, 2018, pp. 1-9.

*Primary Examiner* — Jacob S. Scott
(74) *Attorney, Agent, or Firm* — Mei & Mark, LLP

(57) ABSTRACT

A method of operating a motor in a hydraulic control system can comprise determining a keyon event. A motor of a pump unit can then be turned in a first direction a first predetermined amount to pump a hydraulic fluid in a first flow direction. The turning of the motor in the first direction can be limited to prevent hydraulic actuation of a downstream device via the pumped hydraulic fluid. The motor can then be turned in a second direction a second predetermined amount to pump the hydraulic fluid an opposite second flow direction. Like restriction on the downstream device can be implemented. Subsequent to turning the motor in the first and second directions, hydraulic fluid is delivered to an actuator of the downstream device.

15 Claims, 4 Drawing Sheets

(51) Int. Cl.
    *F16H 48/20*        (2012.01)
    *B60K 23/04*        (2006.01)

(56) References Cited

U.S. PATENT DOCUMENTS

| | | |
|---|---|---|
| 2008/0234101 A1 | 9/2008 | Suzuki |
| 2010/0210390 A1 | 8/2010 | Ekonen et al. |
| 2013/0068885 A1 | 3/2013 | Onomichi et al. |
| 2017/0166181 A1 | 6/2017 | Song et al. |

FOREIGN PATENT DOCUMENTS

| | | |
|---|---|---|
| JP | H02-300581 | 12/1990 |
| JP | H03-213763 | 9/1991 |

MOTOR CONTROL METHOD TO IMPROVE COLD RESPONSE TIME IN A MOTOR PUMP HYDRAULIC SYSTEM

This is a 371 National Stage Entry of Application No. PCT/162018/052637 filed Apr. 16, 2018 which claims the benefit of priority of U.S. provisional application 62/485,847 filed Apr. 14, 2017 all of which are incorporated herein by reference.

FIELD

A motor control system and method to improve cold response time in a motor-pump hydraulic system is disclosed. A device such as an electronic limited slip differential ("eLSD") can have improved operation due to a low temperature dither and system therefor.

BACKGROUND

Solenoid systems can be modulated to lift and lower to pump small quantities of fluids. In larger applications, it is not practical to scale a solenoid. The coil windings become heavy and the packaging becomes too large, and the fluid volume being pumped is too small. However, a solenoid system benefits from good cold start response. Techniques exist for modulating solenoids at cold temperatures. Examples can be found in JP02-300581 or JP03-213763.

So, it is desired to implement a method and system for modulating fluid pumping that has small packaging, higher fluid volume, and good cold start response.

A differential gear mechanism can be provided in an axle assembly and used to transfer torque from a driveshaft to a pair of output shafts. The driveshaft can drive the differential through the use of a bevel gear that meshes with a ring gear mounted to a housing of the differential. In automotive applications, a differential allows the tires mounted at either end of the axle assembly to rotate at different speeds. This is important when the vehicle is turning because the outer tire travels over an arc of greater distance than the inner tire. Thus, the outer tire must rotate at a faster speed than the inner tire to compensate for the greater distance of travel. The differential includes a differential case and a gear arrangement that allows torque to be transferred from the driveshaft to the output shafts while concurrently allowing the output shafts to rotate at different speeds as needed. The gear arrangement can generally include a pair of side gears that are mounted for rotation with the respective output shafts. A series of cross pins or pinion gear shafts are fixedly mounted to the differential case for rotation therewith. A corresponding plurality of pinion gears are mounted for rotation with the pinion gear shafts and are in meshing relationship with both side gears.

Some differential gear mechanisms include traction modifying differentials. Typically, a clutch pack can be disposed between one of the side gears and an adjacent surface of the differential case. The clutch pack or locking mechanism is operable to limit relative rotation between the gear case and the one side gear. In such differentials, engaging the clutch pack or locking mechanism (retarding differentiation) is achieved by one of several different approaches. Some configurations include a piston that actuates to cause the clutch pack to move between open, locked and partially locked conditions. In some examples it is challenging to configure the differential case to accommodate the required components while optimizing packaging space on the vehicle. So, it is beneficial to actuate the clutch of the differential in a small package.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A method of operating a motor in a hydraulic control system can comprise determining a key-on event. A motor of a pump unit can then be turned in a first direction a first predetermined amount to pump a hydraulic fluid in a first flow direction. The turning of the motor in the first direction can be limited to prevent hydraulic actuation of a downstream device via the pumped hydraulic fluid. The motor can then be turned in a second direction a second predetermined amount to pump the hydraulic fluid an opposite second flow direction. Like restriction on the downstream device can be implemented. Subsequent to turning the motor in the first and second directions, hydraulic fluid is delivered to an actuator of the downstream device.

A hydraulic control system can be constructed for implementing the above method. The hydraulic system can comprise a downstream device comprising a hydraulic actuator. A hydraulic control unit can comprise a bi-directional motor, a pump connected to the bi-directional motor, the pump configured to pump a fluid in a first direction and in a second direction, and an electronic control unit ("ECD"). The ECU can comprise a processor, a memory and a control algorithm stored in the memory, the algorithm, when executed by the processor, comprising steps for executing the above method.

DETAILED DESCRIPTION

Figure 1:
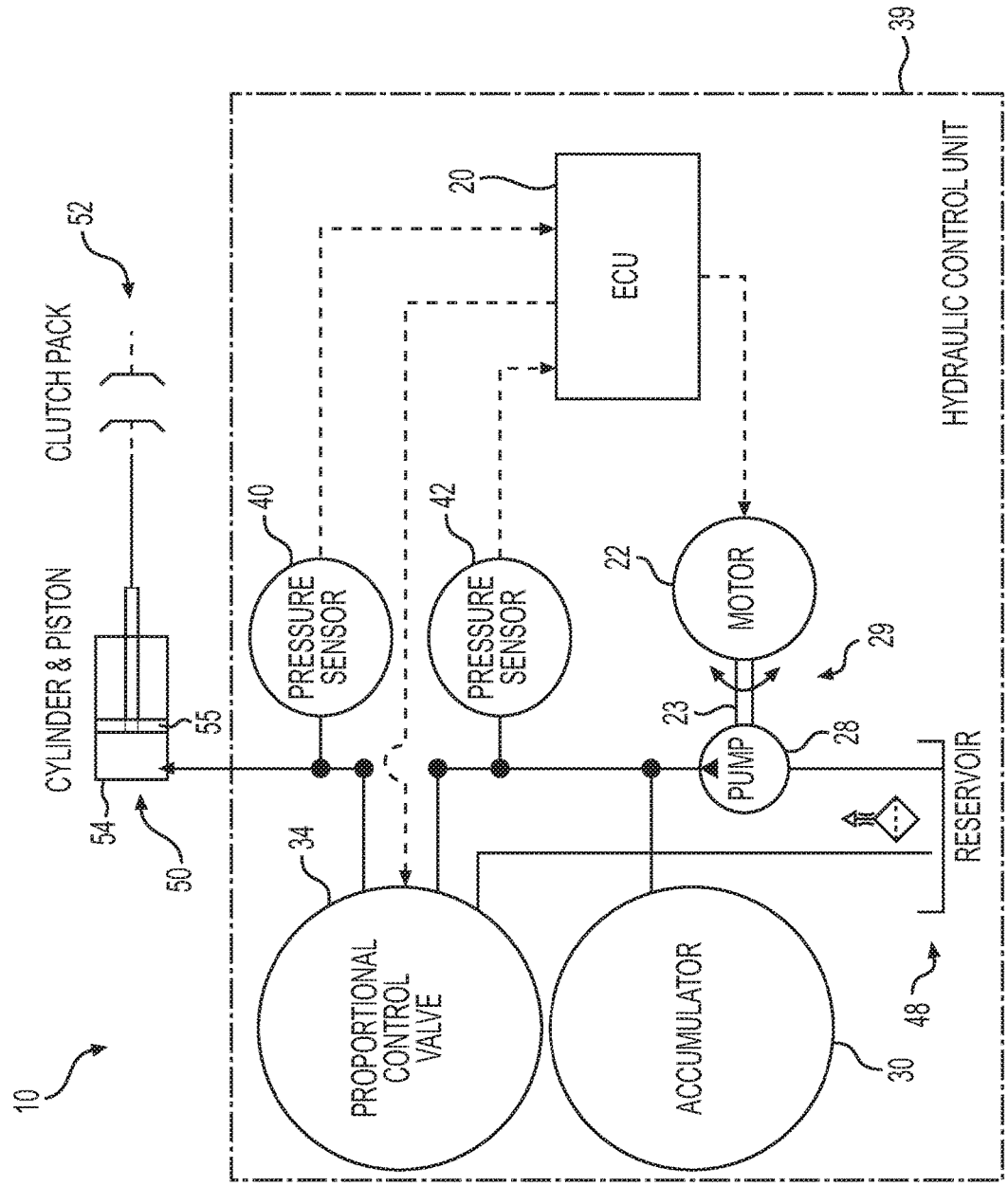
FIG. 1 is schematic diagram of an exemplary hydraulic control unit eLSD constructed in accordance to one example of the present disclosure.

As will be described herein, the present disclosure provides a system and motor control method that allows the moving mechanical elements of a hydraulic pump to be quickly cycled to break the viscous bonds of cold fluid to get them moving. This would allow the elements to move with less resistance and hence improve cold response time.

There are several alternative motors 22, 122, 122 that can be used with the instant disclosure and there are several alternative pumps 28, 128, 228. The alternative motors can comprise aspects that permit bidirectional fluid flow and field-oriented control ("FOC") for the ability to control the motion electronically. Such motors can comprise a brushless DC motor ("BLDC"), a brush—type motor, an inductance motor, or a switched reluctance motor, as examples. The contemplated motors permit a speed control aspect and a torque control aspect via their structure and nature as a field effect motor. This way, the motor 22, 122, 222 can interact with a pump 28, 128, 228 to pump fluid bi-directionally. Discreet motions can be controlled and longer operational periods are enabled. In the working example described herein, the motor comprises a brushless direct current motor comprising a rotor and stator assembly, and the motor is turned in a first direction, such as a forward direction, and in a second direction, such as a reverse direction, by modulating electricity to a rotor and stator assembly. The pump is driven by the motor, and so the hydraulic fluid flows in a first direction when the motor is turned in the first direction, and the hydraulic fluid flows in an opposite second direction when the motor is turned in the second direction. If the motor is "stalled" or held in a neutral position, then fluid flows according to one or both of an internal leak path through the pump or an external leak path through the controlled orifice or leak valve.

A bidirectional hydraulic pump motor can be formed as a pump unit 29, 129, 229. The pump unit can comprise a pump integrally formed with the motor as a single unit, or as drawn, the motor 22, 122, 222 can be linked to the pump 28, 128, 228 via a direct drive arrangement or one or more coupler 23. Coupler can comprise for example shafts and linkages such as gears, or other drive mechanisms. As indicated by the double-headed arrow, the coupler 23 moves bidirectionally, here rotationally, though linear motion can be designed for as an alternative. The pump can comprise, for example, an internal gear pump or gerotor, an external gear pump such as one or more spur gear, an axial piston pump, a radial piston pump, a vane pump, or a roller vane pump, as alternatives. Slight motion of the gerotor or spur gear can be referred to as "chatter" because of the rapid vibrations in cutting the viscous bonds. The chatter here is intentional and programmed in to the ECU 20, 120, 220, and by that programming, is unlike electromagnetic interference or noise in the system. A rattle could be attributed to a slight noise that occurs when physical contact among parts occurs as the pump is dithered, such as gear teeth touching adjacent surfaces.

The capabilities of the bi-directional brushless motor to cycle the motor very fast in a forward and reverse motion (hereinafter "dither") is used to break the oil film viscous drag on the pumping elements thus pre-conditioning the pump and fluid prior to their first required use on the vehicle. This method can be implemented at a "key-on" condition before the system is activated. This way, there is no load on the motor and the field effect motor can move very quickly in the forward and reverse direction. It is possible to minimize the effect on the downstream system. Whereas a prior art system might have a unidirectional pump that pumps fluid in only a single direction to build pressure, such as DE 101 28 856 B4 or U.S. Pat. No. 7,007,782, and whereas a prior art system might alternatively have only one speed for operating a unidirectional pump, the instant pump unit 29, 129, 229 operates bidirectionally to chatter or rattle the pump to break viscous bonds of the fluids without a net effect on the downstream pressure. For example, when using a gear pump, the gear can be rotated on the order of 5 Degrees in each of the forward and reverse directions. Or, the gear can be rotated on the order of 10 Degrees in each of the forward and reverse directions, or on an order in the range of 1-10 Degrees. When using a linear pump, such as a piston pump, the piston can be moved on the order of a millimeter or a few millimeters. Other amounts of gear rotation or linear pump piston motion can be selected based on the volumetric efficiency of the pump and the responsiveness of the downstream system. Instead of storing pressure via a solenoid or valve control, the reverse motion of the pump unit relieves pressure and avoids erratic behavior of the downstream system. The extent of motor motion can be controlled to avoid appreciable motion or chatter of the downstream system. It is possible to dither the pump without overcoming the inertia of the downstream system.

By breaking the viscous bonds in the fluid, the fluid is preconditioned and the response time of downstream systems in subsequent events is faster. Post-key-on events, such as clutch prefill events or power transfer commands can be implemented with greater accuracy and faster times. The fluid is conditioned without negatively interfering with other system operations. When considering other types of "dither" operations to bring a clutch or other hydraulic device to a desired pressure or clamp force, such as U.S. Pat. No. 9,803,706 owned by the instant Applicant, using a preconditioned fluid augments the ability to quickly come to a desired pressure. In cold start conditions of −40 Degrees Centrigrade, the motor dither for driving the pump forward and reverse permits the fluid to subsequently behave as a "warm" system would behave despite the ostensible −40 degree temperature of the fluid.

One intended use would be in the eLSD. The bi-directional motor is "dithered" without activating the clutch, but prepares the pump elements for operation at extreme cold temperature. This could be implemented at a vehicle neutral position or any other non-driving scenario. Other alternative downstream devices can comprise power take off ("PTO") units, power steering units, other torque transferring clutches such as those coupled to the engine flywheel or to an air compressor or air conditioner. The applicability of the disclosure isn't limited to clutches, and it can be applied to other pressure-controlled cylinders such as those having a piston for controlling fluid output.

Turning now to FIG. 1, a hydraulic control system according to a first example is shown and generally identified at reference 10. As will become appreciated, the hydraulic control system 10 will be described herein operating with an eLSD as the downstream device, however the same hydraulic control system may be used with a variety of downstream devices. The hydraulic control system 10 generally includes an hydraulic control unit 39 comprising an ECU 20, a motor 22, a pump 28, an accumulator 30, a proportional control valve 34, a first pressure sensor 40, a second pressure sensor 42 and a reservoir 48.

The hydraulic control system 10 communicates hydraulic fluid to the downstream device shown schematically to comprise a cylinder 54 and piston 55 as the actuator 50 that in turn actuates a clutch pack 52. The piston can be moved in response to the fluid entering and exiting the hydraulic control unit 39. For example, when fluid is pumped from the pump 28 to the cylinder, the piston can move to compress the clutch pack 52. For example, when a dry clutch is the downstream device, the piston can directly press on the clutch pack 52. When the downstream device is a wet clutch, the piston can compress the fluid in the wet clutch pack in known ways. When the wet clutch is affiliated with a limited slip differential, the slip can be appropriately controlled.

In a system such as shown in FIG. 1, the fluid pressure can be monitored on either side of the proportional control valve 34 by the pressure sensors 40, 42. A feedback algorithm in the electronic control unit ("ECU") 20 enables responsive control of the proportional control valve 34 and of the motor 22. Larger degrees of pump motion can be accommodated to break viscous bonds in the fluid by closing the proportional control valve 34 and directing fluid in and out of an accumulator 30. Bi-directionally operating the motor 22 and the pump 28 conditions the fluid for faster cold-start response times when the proportional control valve 34 is opened for filling the cylinder 54 and actuating the piston 55.

Figure 2:
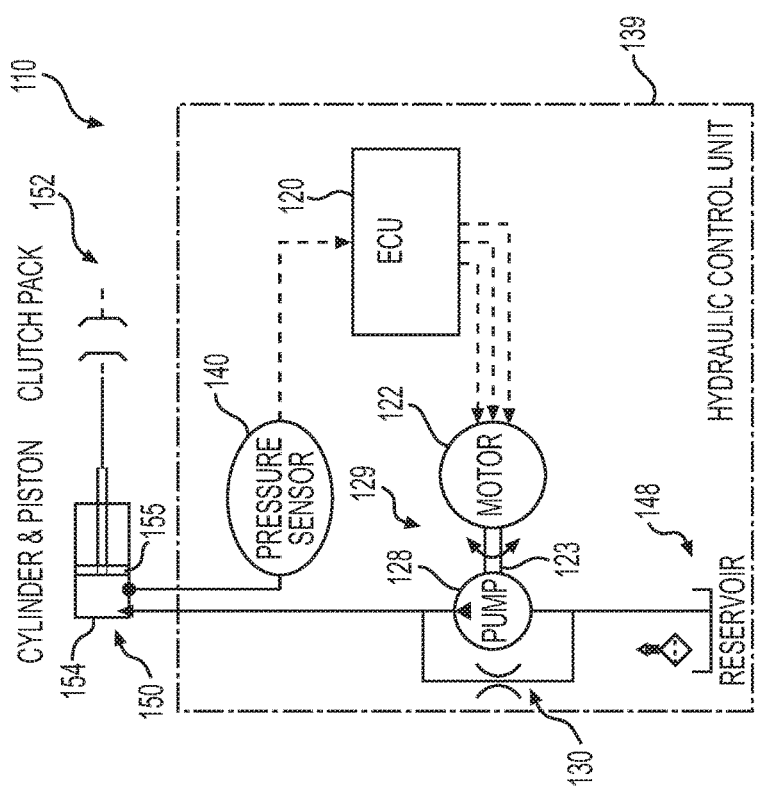
FIG. 2 is schematic diagram of an exemplary hydraulic control unit eLSD constructed in accordance to another example of the present disclosure.

The first hydraulic control system 10 is more complicated in part count than the subsequent hydraulic control systems 110, 210. In a second configuration as shown in FIG. 2, a hydraulic control system 110 includes an hydraulic control unit 139 comprising an ECU 120, a motor 122, a pump 128, a pressure sensor 140, and a reservoir 148. While the pump 128 can comprise a configurable internal leak path back to reservoir 148, an external leak path comprising a controlled orifice 130 or controlled valve can also be included to permit fast deactivation of the actuator 150 or to control the pump up of the actuator 150. The controlled orifice 150 can also be designed to permit fluid flow during the key-on dither operation to avoid accumulating actuation pressure in the cylinder 154. Or, the dither operation can be controlled so as not to appreciably move fluid outside the pump 128. It is possible to move the pump in a first direction to sweep fluid in the first flow direction and to break viscous bonds along the configurable leak path. Then, it is possible to move the pump in a second direction sweeping fluid in the second direction and breaking viscous bonds along the configurable leak path. Because of the backwards leaking along the leak path, the forward motion can be greater than the reverse motion in some embodiments.

Figure 3:
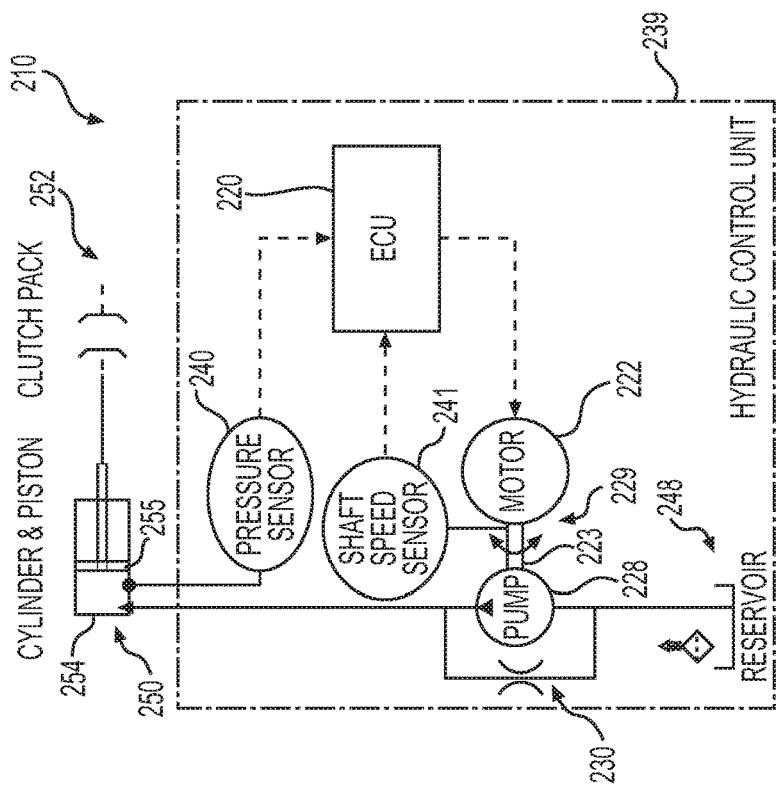
FIG. 3 is schematic diagram of an exemplary hydraulic control unit eLSD constructed in accordance to another example of the present disclosure.

The hydraulic control unit 139 communicates hydraulic fluid to a cylinder 154 and piston 155 of an actuator 150 that in turn actuates a clutch pack 152. Pressure in the cylinder 154 can be monitored via pressure sensor 140 and a feedback path to ECU 120. Based on the feedback received, control signals for the pump unit 129 can be generated in the ECU 120 to avoid accumulation of actuation pressure in the cylinder 154 during cold start dither operations. FIG. 2 shows three pathways, one each of forward, reverse, and "stalled" or neutral commands. The stalled or neutral command can be used to hold the pump in a neutral condition between forward and reverse conditions, as when the key-on dither operation is complete. FIG. 3 provides one pathway between motor 222 and ECU 220, but the motor 222 is likewise capable of forward, reverse, and "stalled" or neutral action via the single pathway. The motors 122, 222 are designed to require one or three pathways as a configurable constraint.

In a third configuration as shown in FIG. 3, a hydraulic control system 210 includes a downstream device and a hydraulic control unit 239 comprising an ECU 220, a motor 222, a pump 228, a high pressure sensor 240, a shaft speed sensor 241, and a reservoir 248. The hydraulic control unit 239 communicates hydraulic fluid to downstream device comprising a cylinder 254 and piston 250 that in turn actuates a clutch pack 252.

In this third configuration, pressure sensor 240 can comprise one or more sensors such as high and low pressure sensors for sensing the pressure in cylinder 254. The sensed pressure is conveyed as pressure data to ECU 220. Shaft speed sensor 241 can monitor a shaft connecting motor 222 to pump 228 to provide additional pump unit data to ECU 220. For example, the direction of rotation of the shaft and the volume of fluid flow can be derived in the ECU 220 based on shaft speed data sensed by the shaft speed sensor 241. An algorithm in ECU 220 can command motor 222 operation in response to the collected pressure data and pump unit data. Key-on dither operations can thus be controlled to avoid build-up of actuation pressure in the cylinder 254. As above, a controlled orifice 230 or control valve can be included. Then, an external leak path can be provided between the pump outlet and the reservoir 248. Pump 228 can also comprise a known leak path back to the reservoir.

In one example such as when starting a vehicle in a cold environment, a bi-directional brushless direct current motor ("BLDC") can be used to dither the motor bi-directionally to wake up the gear set prior to requiring actuation of the clutch pack. By driving the motor forward and in reverse (repeatedly in a back-and-forth fashion), the viscous fluid can be moved (viscous bonding can be broken) to reduce drag on the pumping elements so that when the system is needed to deliver hydraulic fluid to the cylinder and piston, the response time is quicker. The mechanical parts can be kept buzzing at a microscopic level such that they are ready to respond for the first desired operational event (in this example, delivering hydraulic fluid to the cylinder and piston in an eLSD). It is further contemplated that the same system may be used to warm the temperature of the hydraulic fluid, as by running the dither operation after key-on and until an operational event is commanded. For example, the key-on dither event can continue until a clutch prefill algorithm is implemented. Or, the key-on dither event can be used before a clutch prefill algorithm is implemented, and then can continue after the prefill algorithm is complete so as to warm the fluid pending an operational event command for the clutch. Examples of operational events for command comprise clutch engage or disengage commands, and such commands can issue based on whether the clutch is biased open or closed.

As another alternative, the key-on dither can be interleaved to occur during nominal operational events so as to heat the hydraulic fluid. For example, a cold start can comprise the key-on dither to break viscous bonds and improve response time. The viscous bonds broken, the hydraulic fluid need not rise above the cold start temperature to improve response times. Then, prefill or clutch actuation events can occur. If the hydraulic fluid is below a desired temperature, indicative of cold operations, the key-on dither techniques can be incorporated as cold-start dither techniques to dither the motor in between prefill and actuation commands, so that the motor is moved forward and reverse to frictionally heat the fluid. As yet another alternative, it is possible to delay the prefill or actuation events until the hydraulic fluid is heated, in which case the key-on dither is maintained until the hydraulic fluid reaches a desired temperature. To permit temperature data to be collected for processing by the ECU 20, 120, 220, the pressure sensors 40, 42, 140, 240 can comprise a temperature sensor.

Figure 4:
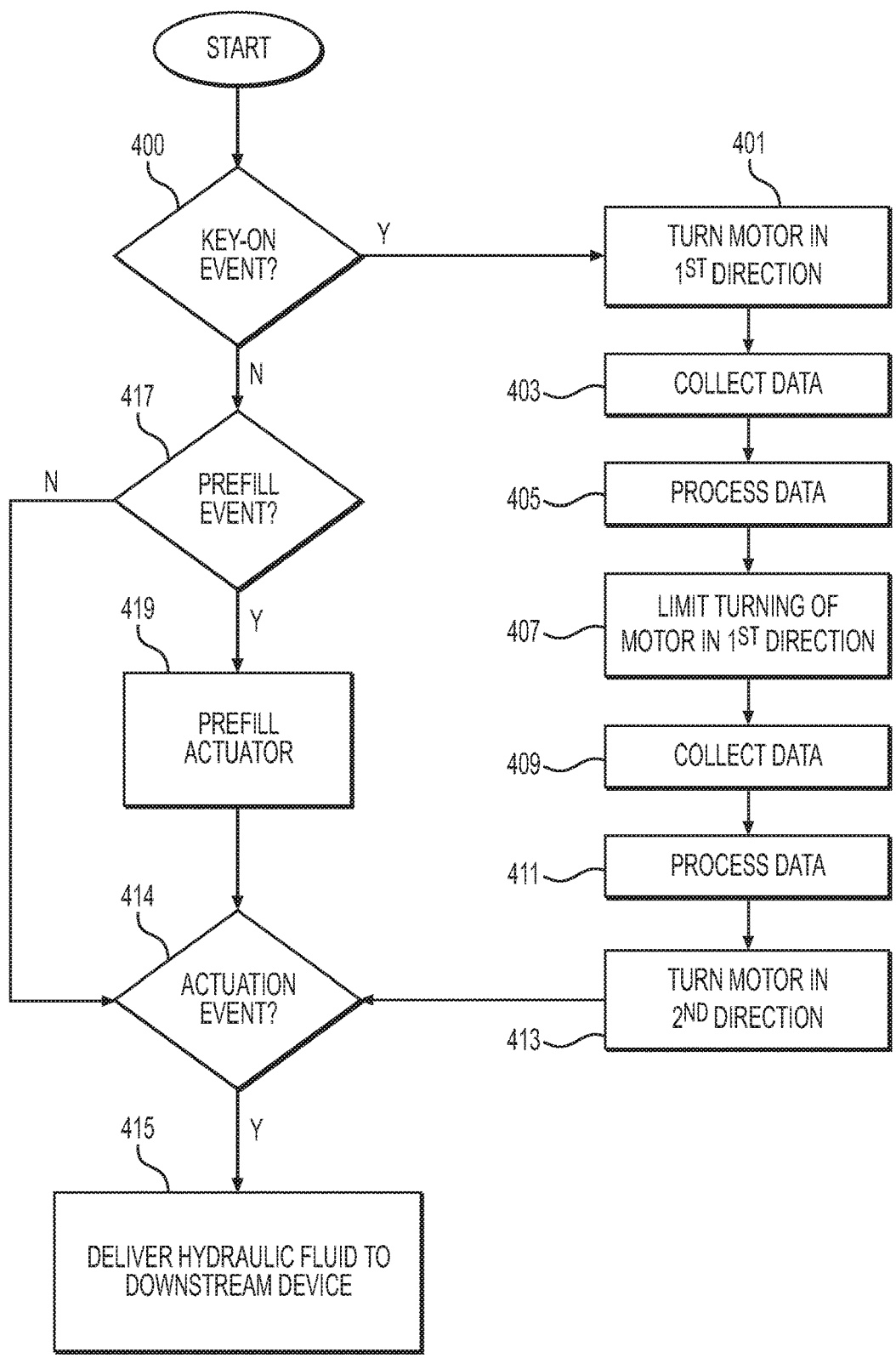
FIG. 4 is a flow diagram explaining a method according to the disclosure.

Turning to FIG. 4, one method can start with affirmatively sensing a key-on event in step 400. In an automotive application, this could comprise an ignition sequence. In other devices, a power-on sequence can be detected. Progressing to step 401, the motor is turned in a first direction. It is possible to pre-program the amount of turning. Or, optional step 403 can be included to sense and collect data and optional step 405 can follow to process the collected data. Steps 403 & 405 can comprise use of one or more of a pressure sensor for collecting pressure data, a temperature sensor for collecting temperature data, and a motor shaft speed sensor for collecting motor speed data, as outlined above. Forwarding the collected data permits processing by the ECU 20, 120, or 220. The algorithm stored in the ECU can comprise instructions for implementing steps for processing one or more of the collected pressure data, temperature data or motor speed data to generate commands to limit the turning of the motor in the first direction to prevent hydraulic actuation of the downstream device via the pumped hydraulic fluid. For example, an upper or lower pressure limit can be set, and the data collection and processing can result in motor commands to prevent the motor from pumping fluid in violation of those limits. As above, pressure sensor 140, 240 can comprise a high pressure sensor and a low pressure sensor. When the first direction is a forward, or pressure increasing direction from the reservoir towards the downstream device, the motor is limited so that it does not pump fluid in excess of the set upper pressure limit and the high pressure sensor collects data related to high pressure conditions. So, step 407 limits the turning of the motor in the first direction to avoid exceeding a high pressure limit.

Then, the motor direction can be reversed to turn in a second direction, as in step 413. This change in directions can be pre-programmed and the amount of turning can be pre-programmed. Or, optional step 409 can collect more data and optional step 411 can process the collected data. The optional steps are similar to the above optional steps 403 & 405, though the direction of rotation of shaft 23, 123, 223 is reversed and so is the direction of fluid flow. If the second direction is a reverse, or pressure decreasing direction, fluid is drawn in a direction from the actuator 50, 150, 250 towards the reservoir 48, 148, 248. A low pressure sensor can be used to provide pressure data for ensuring that the pump does not reduce the pressure at the actuator beyond the set limit.

Other data can comprise, as above, the shaft speed data from the shaft speed sensor 241, wherein the ECU can calculate actual or predicted fluid flow by monitoring the speed and direction of the shaft 223.

The key-on dither sequence outlined for steps 401, 403, 405, 407, 409, 411, & 413 can be repeated a number of times before progressing to determining whether an actuation event has been commanded in step 414. With the viscous bonds broken and the fluid pre-conditioned, a fast response time can be achieved with the delivery of hydraulic fluid to the downstream device in step 415. As above, this can comprise delivering hydraulic fluid to a cylinder of an actuator 50, 150, 250.

If a key-on event is not detected, nominal operations can be implemented, as by checking for a pre-fill event in step 417, prefilling the actuator 50, 150, 250 in step 419. If prefill events are complete, the hydraulic control system 10, 110, 210 can check for additional actuation events as in step 417 or idle as appropriate.

Figure 5:
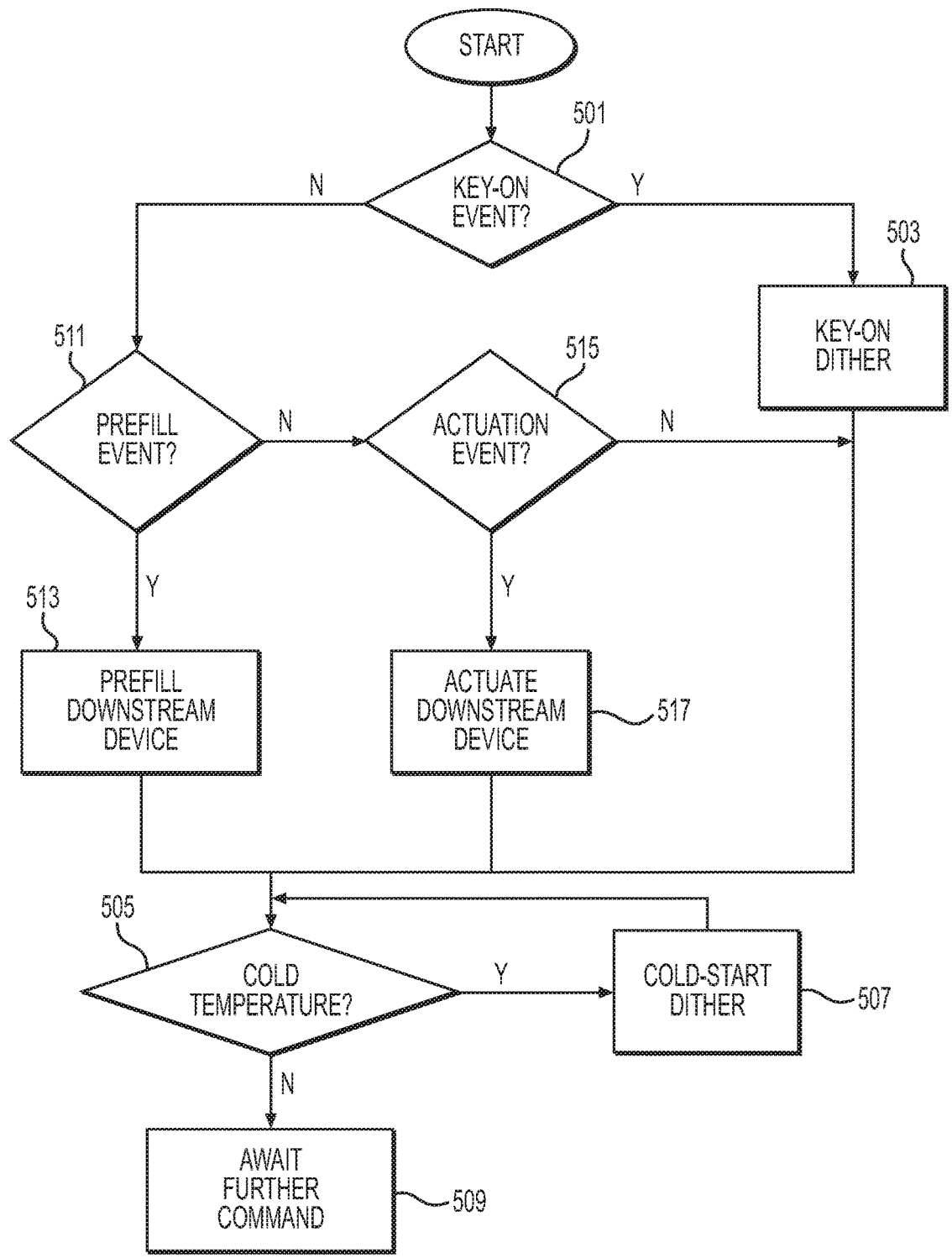
FIG. 5 is a flow diagram explaining another method according to the disclosure.

In FIG. 5, an alternative method is shown with a cold temperature mitigation strategy embedded therein. The method begins with the determination of whether a key-on event has occurred in step 501. If so, the key-on dither operations of FIG. 4 can be implemented in step 503. After the key-on dither pre-conditions the hydraulic fluid to break viscous bonds, the fluid can ostensibly be in a cold start condition, such as −40 Degrees Centigrade or some other low temperature condition. Many applications are designed for the low temperature start but the fluid operates best at some other temperature that is much warmer. If a cold temperature lower than an ideal temperature is determined in step 505, the key-on dither techniques can be adapted to provide a friction-warming cold-start dither of the hydraulic fluid in step 507. Adaptation of the key-on dither can comprise switching between the first and second motor directions for additional repetitions and implementing the dither after key-on and when prefill and actuation events are not being commanded. Once the hydraulic fluid is warmed to the ideal temperature, it is possible to await further commands such as key-off or actuation events in step 509.

If no key-on event is determined in step 501, the method checks for a pre-fill event in step 511, and if the determination is affirmative, the downstream device is prefilled in step 513. If the pre-fill event is not determined, then an actuation event is checked for in step 515. If an actuation event is determined affirmatively, then the downstream device is actuated in step 517. If no prefill or actuation event is determined, then the cold temperature determination can be completed in step 505.

The foregoing description of the examples have been provided for purposes of illustration and description. It is not intended to be exhaustive. Individual elements or features of a particular example are generally not limited to that particular example, but, where applicable, are interchangeable and can be used in a selected example, even if not specifically shown or described. The disclosure can be varied in many ways. Such variations are intended to be included within the scope of the disclosure.

What is claimed is:

1. A method of operating a motor in a hydraulic control system, the method comprising:
   determining a key-on event;
   turning a motor of a pump unit in a first direction a first predetermined amount to pump a hydraulic fluid in a first flow direction;
   limiting the turning of the motor in the first direction to prevent hydraulic actuation of a downstream device via the pumped hydraulic fluid;
   turning the motor in a second direction a second predetermined amount to pump the hydraulic fluid an opposite second flow direction; and
   subsequent to turning the motor in the first and second directions, delivering the hydraulic fluid to a cylinder and piston associated with the downstream device.

2. The method of claim 1, wherein delivering the hydraulic fluid to a cylinder and piston associated with the downstream device comprises actuating a limited slip differential.

3. The method of claim 1, wherein turning the motor in the second direction the second predetermined amount comprises limiting the turning of the motor in the second direction to prevent actuation of the downstream device.

4. The method of claim 1, wherein the motor comprises a brushless direct current motor and wherein the motor is turned in the first direction and in the second direction by modulating electricity to a rotor and stator assembly.

5. The method of claim 1, further comprising sensing fluid pressure of the downstream device to collect pressure data; and processing the pressure data to limit the turning of the motor.

6. The method of claim 1, further comprising sensing a shaft speed of a shaft between a pump and the motor of the pump unit to collect pump unit data; and processing the pump unit data to limit the turning of the motor.

7. The method of claim 6, wherein the pump is an external gear pump comprising a spur gear, and wherein the spur gear is chattered by the turning of the motor in the first and second directions.

8. The method of claim 6, wherein the pump is an internal gear pump comprising an internal gear, and wherein the internal gear is chattered by the turning of the motor in the first and second directions.

9. The method of claim 1, comprising heating the hydraulic fluid by repeatedly turning the motor in the first and second directions prior to delivering the hydraulic fluid to the cylinder and piston associated with the downstream device.

10. The method of claim 1, comprising heating the hydraulic fluid by repeatedly turning the motor in the first and second directions subsequent to delivering the hydraulic fluid to the cylinder and piston associated with the downstream device.

11. The method of claim 1, further comprising leaking fluid internally through the pump unit via a controlled leak path through a pump of the pump unit.

12. The method of claim 1, further comprising leaking fluid externally around the pump unit via a controlled orifice in a leak path between the downstream device and a reservoir connected to the pump unit.

13. The method of claim 12, further comprising restricting the turning of the motor of the pump unit in the first direction the first predetermined amount such that the hydraulic fluid breaks viscous bonds as it moves in the controlled leak path.

14. A hydraulic control system, comprising:
a downstream device comprising a hydraulic actuator;
a hydraulic control unit, comprising:
an bi-directional motor;
a pump connected to the bi-directional motor, the pump configured to pump a fluid in a first direction and in a second direction;
an electronic control unit comprising a processor, a memory and a control algorithm stored in the memory, the algorithm, when executed by the processor, comprising steps for:
determining a key-on event;
turning the bi-directional motor to pump fluid in the first direction a first predetermined amount to pump a hydraulic fluid in a first flow direction;
limiting the turning of the motor in the first direction to prevent hydraulic actuation of the downstream device via the pumped hydraulic fluid;
turning the motor in the second direction a second predetermined amount to pump the hydraulic fluid an opposite second flow direction to break viscous bonds in the hydraulic fluid; and
subsequent to turning the motor in the first and second directions, delivering the hydraulic fluid to the downstream device.

15. The hydraulic control system of claim 14, further comprising one or more of a pressure sensor for collecting pressure data, temperature sensor for collecting temperature data, and a motor shaft speed sensor for collecting motor speed data, wherein the algorithm further comprises steps for processing one or more of the collected pressure data, temperature data or motor speed data to generate commands to limit the turning of the motor in the first direction to prevent hydraulic actuation of the downstream device via the pumped hydraulic fluid.

* * * * *